United States Patent [19]

Fath et al.

[11] 4,112,341
[45] Sep. 5, 1978

[54] DRIVE AND BRAKE CIRCUIT FOR SPEED CONTROLLED DC MOTORS

[75] Inventors: Horst Fath, Weinheim; Reiner Nill, Leutershausen, both of Fed. Rep. of Germany

[73] Assignee: BBC Brown, Boveri & Company Limited, Baden, Switzerland

[21] Appl. No.: 750,671

[22] Filed: Dec. 15, 1976

[30] Foreign Application Priority Data

Dec. 19, 1975 [DE] Fed. Rep. of Germany ....... 2557208

[51] Int. Cl.² .............................................. H02P 3/14
[52] U.S. Cl. .................................... 318/370; 318/380
[58] Field of Search ............... 318/139, 269, 273, 368, 318/370, 371, 379, 380

[56] References Cited

U.S. PATENT DOCUMENTS

| 3,582,742 | 6/1971 | Martin | 318/368 X |
| 3,651,390 | 3/1972 | Vidal et al. | 318/379 X |
| 3,876,920 | 4/1975 | Meissen et al. | 318/370 |
| 3,983,465 | 9/1976 | Tsuboi et al. | 318/380 X |
| 4,049,998 | 9/1977 | Boxer | 318/139 X |

*Primary Examiner*—James R. Scott
*Assistant Examiner*—W. E. Duncanson, Jr.
*Attorney, Agent, or Firm*—Toren, McGeady and Stanger

[57] ABSTRACT

In a system which controls the speed of a DC motor and in which the motor is driven by connecting the motor field winding and a series rectifier across the motor armature, a braking force is applied by connecting the armature across a braking resistor and the series rectifier. Regenerative braking is accomplished by connecting the armature across the line when the line voltage is low, and non-regenerative braking is accomplished through a series resistor when the line voltage is high. Suitable diodes or control rectifiers connect the armature across the line or the braking resistor.

24 Claims, 2 Drawing Figures

DRIVE AND BRAKE CIRCUIT FOR SPEED CONTROLLED DC MOTORS

BACKGROUND OF THE INVENTION

This invention relates to a drive and brake circuit for a speed controlled DC motor, and particularly to circuits for driving and braking motors that power or impart motion to rolling vehicles.

Such circuits often apply current to the motor from a DC source through a choke and a DC regulator or controller. A brake resistance and a first diode is generally connected across the motor field winding. A circuit arrangement including switches shifts the motor between a drive mode and a brake mode. In a drive mode the armature is connected in parallel with a field winding and a series rectifier. In the braking mode the armature is connected across a brake resistance and the series rectifier. An example of such a circuit is disclosed in German patent publication P 23 19 898.

A circuit of this type has the advantage that a continuous weakening of the field occurs with increasing armature voltage, both in the drive and braking modes. Also, the brake resistance need not be stepped, that is, galvanic switching apparatuses are not necessary for varying the brake resistance in response to the voltage which the motor supplies when it acts as a generator. However, such known circuits do not permit regenerative braking, i.e., feeding energy back into the power system that supplies the motor. Such regenerative braking is valuable in a traffic network of electric-motor operated vehicles because it reduces the total energy consumed by the traffic network utilizing such motors.

However, a disadvantage of such regenerative braking circuits is that the brake is not always available when the power system fails, or when there are no vehicles capable of absorbing the energy. Thus regenerative braking cannot be used. In contrast with the concept of a regenerative braking system, the aforementioned circuit using the brake resistance is independent of the power system.

An object of the invention is to improve drive and brake systems.

Another object of the invention is to adapt the aforementioned known resistance brake circuit as a regenerative brake.

According to the invention, these objects are attained, in whole or in part, by making the rectifier controllable and connecting the armature alternately across the source when the source voltage is sufficiently low to indicate that the network is capable of absorbing energy, and across the brake resistor, when the source voltage exceeds a predetermined value and thereby indicates that the network is incapable of absorbing energy.

According to another feature of the invention, the rectifier is controllable and a second diode is arranged between the extinguishing diode of the DC control device and one terminal of the resistor while, during braking operation, a third diode is arranged between one terminal of the field winding and one terminal of the choke. By virtue of these features, the system performs dynamic braking both regeneratively and non-regeneratively, or resistively. While driving, the braking circuit's controllable rectifier, in the form of a thyristor, operates as a switching member for the free running current of the field winding. While driving the motor this circuit behaves substantially like the aforementioned circuit disclosed in German patent publication No. 2,319,898.

According to another feature of the invention, suitable means ignite the thyristor during the drive operation a predetermined time interval after the ignition pulse of a thyristor in the DC controller. This provides a firing pulse after each inactive period of the controller. Such a pulse is necessary because a thyristor is provided instead of an armature-free-running diode in the aforementioned German patent publication No. 2,319,898.

According to another feature of the invention, suitable means set the time interval between the firing pulse of a reversing thyristor and the firing pulse of the main thyristor in dependence upon the armature current. This utilizes the fact that the inactive period of the DC controller or regulator depends upon the armature current.

According to another embodiment of the invention, means fire the thyristor during braking, only when a predetermined minimum voltage is applied across a capacitor. Suitable means apply the firing pulses of the thyristor after a controllable time interval from the firing pulse of the extinguishing thyristor in the DC regulator.

According to another feature of the invention, means respond to a sensor across the voltage applied to the capacitor for deriving the time interval of the firing pulses of the main thyristor from the firing pulses of the extinguishing thyristor.

According to another embodiment of the invention, a fourth diode extends between the input of the DC controller and the line joining one terminal of the field winding of the drive motor with the first diode. The second diode conducts in the forward direction between the anode of the thyristor and the cathode of the extinguishing diode in the DC controller.

Moreover, according to a preferred embodiment of the invention, the brake resistor is provided with a tap which is connected to one terminal of the field winding. One end of a switch is connected to the line joining the first diode with the terminal of the field winding, and a second end is connected with the first terminal of the resistor. A second switch includes one end connected to the tap of the resistor joined to the second terminal of the field winding, and a second end is connected with the first diode as well as the second terminal of the resistor. A third switch connects the current source through the choke with the input of the DC control device or regulator. A fourth switch is connected between the ground potential of the capacitor and the conducting line. During drive operation the first switch, the second switch and the third switch as well as the fourth switch are closed. During braking, the aforementioned switches are opened and a supplementary switch connects the output of the DC regulator to ground potential.

During braking, the DC regulator is connected parallel to the armature. The third diode and the DC controller connects the field parallel to the armature. Thus, one segment of the resistor constitutes a compound resistance in the field free running current path. The first diode operates as a decoupling diode to the power network and the thyristor serves as a switch for connecting the brake resistor. At the same time the second diode produces a connection to the extinguishing circuit of the DC regulator. The latter permits extinction of the thyristor in the brake resistor circuit simultaneously with the main thyristor of the DC regulator.

These and other features of the invention will be pointed out in the claims forming portion of this specification. Other advantages of the invention will become evident from the following detailed description when read in light of the accompanying drawing.

DESCRIPTION OF PREFERRED EMBODIMENTS

Figure 1:
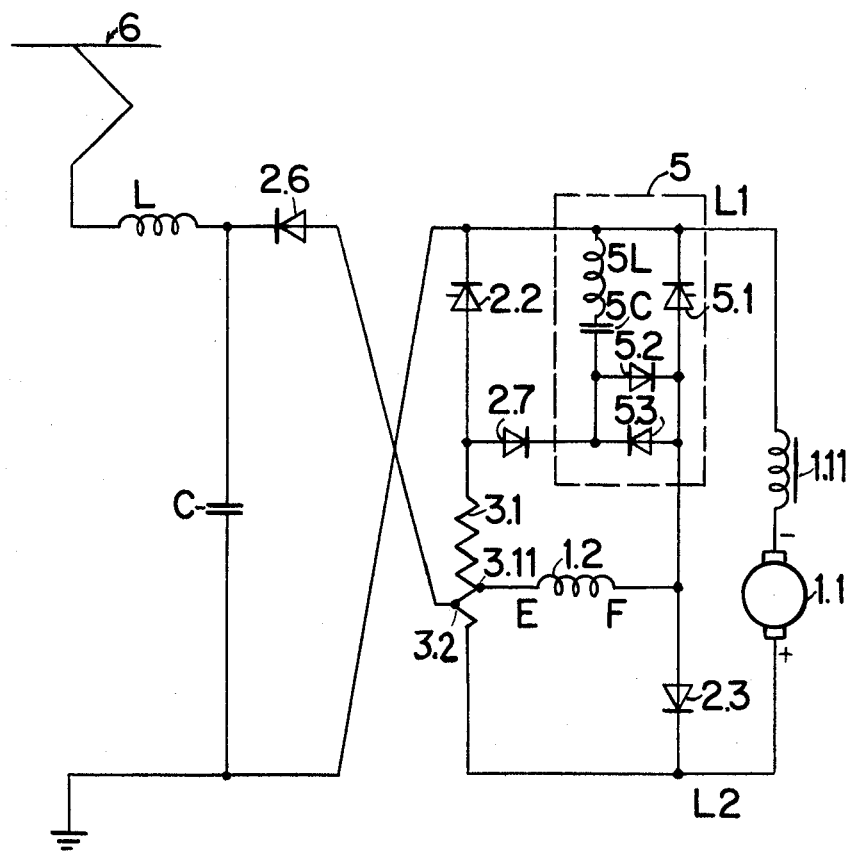
FIG. 1 is a schematic drawing of a dynamic braking circuit embodying features of the invention.

In the drawings, an armature 1.1 with terminals A and B, and a field winding 1.2 with terminals E and F, form a motor 1. An inductor L passes current from suitable input terminals, i.e. a current collector 6 and ground, along a conductor line L 1.1. A capacitor C is connected between the inductor L and ground.

An upper line is designated $L_1$ and a lower line $L_2$. A diode 2.1 in line $L_1$ between a DC control, controller or regulator 5 and an armature 1.1 blocks reverse current. A thyristor 2.2 in the field circuit blocks current in the direction of the field. Another diode 2.3 is arranged parallel to the field winding 1.2 and blocks current from the line $L_2$ to the line $L_1$. A brake resistance or resistor 3.1 is provided with a tap 3.11. Another diode 2.4 connected between the input of the DC control 5 and the terminal F of the field winding blocks current to the latter. A diode 2.6 is arranged between the terminal F of the field winding 1.2 and the output of the inductor L.

The DC controller 5 is composed of a main thyristor 5.1, reversing thyristor 5.2, an extinguishing or quenching diode 5.3, a commutating choke 5L, and a commutating capacitor 5C, all of which are conventionally connected. Furthermore, one end of a quenching or extinguishing diode 2.7 is connected to a terminal of the DC control element 5 at the extinguishing diode 5.3. The other end of the quenching diode 2.7 is connected to the junction of thyristor 2.2 and resistance 3.

Figure 2:
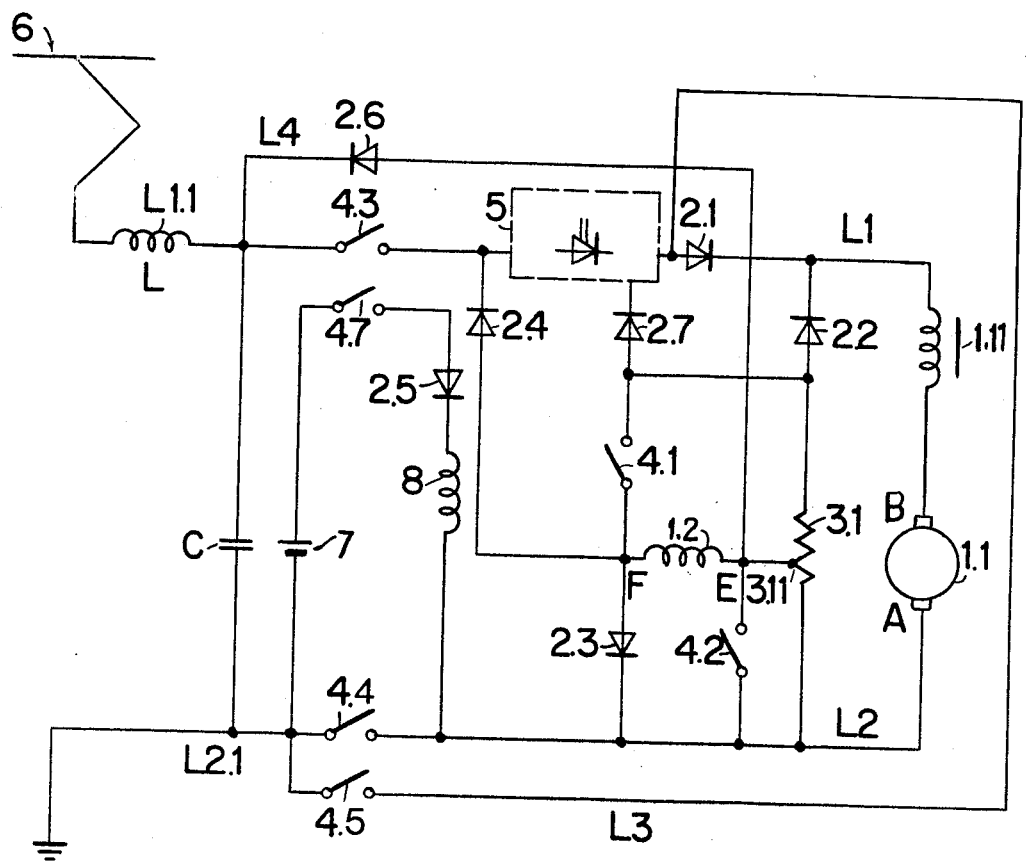
FIG. 2 is a schematic drawing of a drive and brake circuit embodying features of the invention.

In the circuit of FIG. 2, the operation for switching from starting to braking operation is accomplished with the aid of a number of switches. A first switch 4.1 is connected between the junction joining the thyristor 2.2 and the resistance 3. A second switch 4.2 appears between the terminal E of field winding 1.2 and the line $L_2$. A third switch 4.3 occurs in the line L 1.1 between the inductance L and the DC control 5. A fourth switch 4.4 appears in the line L 2.1 between ground and the line $L_2$. A fifth switch 4.5 lies along a connecting conductor $L_3$ between connecting line L 2.1 and line $L_1$. Yet another switch 4.7 lies in the current path of a field pre-exciting device composed of a pre-exciter current source 7, an inductor 8, and a diode 2.5. The pre-exciting device bridges the switch 4.5.

The braking circuit of FIG. 1 operates as follows. A pre-exciting circuit, not shown, energizes the field winding 1.2 of the DC current motor 1 and induces a voltage in the armature 1.1. A measuring apparatus measures the voltage $V_n$ appearing at the input terminals of the circuit in order to establish whether the source or feed network, 6 to ground, is set for absorbing energy. This is the case when the voltage drops below a predetermined value. Under these circumstances, the thyristor 2.2 is not ignited. Thus the current path including the brake resistance 3.1 does not carry current. The voltage induced in the motor armature causes flow of current through the conductor $L_2$ and the partial resistance 3.2. The latter flows to the contact line, through the diode 2.6, and the inductor L when the induced voltage is greater than the network voltage appearing at the contact line. The current flows back from the rail over line $L_1$ to the other terminal of the armature of the DC motor. The field current follows the same path through the conductor $L_2$, the partial resistor 3.1, the field winding 1.2, the main thyristor 5.1 of the current control 5, the line $L_1$, and back to the armature 1.1 of the DC motor 1. By corresponding timing of the DC control 5, the voltage at the motor armature 1.1 is controlled so that a current corresponding to the desired braking torque is obtained.

When the voltage on the power system exceeds a predetermined value, which is an indication that the power system cannot absorb energy, the thyristor 2.2 is turned on. Thyristor 2.2 is quenched by diode 2.7 in synchronism with the DC control 5. If the network is in a state in which it is not capable of absorbing energy, the thyristor 2.2 is again ignited. The braking resistor 3.1 then absorbs the braking energy and the current flows from the motor armature 1.1, through the braking resistor 3.1, through the thyristor 2.2 and back to the motor armature 1.1. The timing or clock ratio of the DC control 5 here also establishes the excitation current and hence also the braking current. The field current also flows through the free running diode 2.3 and the lower portion of the braking resistance 3.1 during the blocking time of the DC control 5.

The starting or driving and braking circuit of FIG. 2 operates as follows. In the driving operation, the switches 4.1, 4.2, 4.3, and 4.4 are closed while the switches 4.5 and 4.7 are opened. A drive-operating current flow occurs from the contact line 6 through the closed switch 4.3, the control 5, the diode 2.1, the motor armature 1.1, through the line $L_2$, to the rails at ground potential. The field winding 1.2 carries no current flowing from the contact line during the open periods of the direct current control 5. During the blocked times of the controller 5, the armature current continues to flow due to the inductance of the motor armature 1.1. This flow occurs through the closed switch 4.1, the thyristor 2.2, and back to the armature 1.1. The ignition apparatus for the thyristor is not illustrated in the drawing. During driving operation, this thyristor operates as an armature free-running diode and must therefore receive an ignition pulse each time after the inactive period of the DC controller.

Because the inactive time depends upon the armature current, the time interval between the ignition pulse of the quenching thyristor of the DC control 5 and the ignition pulse of the thyristor 2.2 is established in dependence upon the armature current.

In the open period of the DC control 5, during which no current from the armature 1.1 can flow through the field winding 1.2, the inductance of the field winding 1.2 continuously drives a field current through the free wheeling diode 2.3 and the closed switch 4.2 and back to the field winding 1.2. Relatively short current pulses in the armature circuit of the DC controller 5 cause the field winding 1.2 to be fully excited. Relatively long pulses from the DC control element 5 cause the field winding 1.2 to be traversed by a current with a lower effective value. Thus the current and field winding 1.2 diminishes with increasing voltage on armature 1.1. That is, the field becomes weaker. In the drive mode, the diodes 2.4, 2.5, and 2.6 are in a blocking condition and their current paths are not traversed by current.

In the braking mode, the switch contacts 4.5 and 4.7 are closed. The switch contacts 4.1 to 4.4 are opened. A preexciting current flows from the battery through the switch 4.7, the diode 2.5, the inductance 8, the line $L_2$, the lower part of the brake resistance 3.1, the field winding 1.2, the diode 2.4, the DC control 5, the connecting line $L_3$, the switch 4.5, and back to the battery. The voltage thus induced in the armature winding 1.1 drives a current through the line $L_2$, the lower part of brake resistance 3.1, field winding 1.2, diode 2.4, DC control 5, diode 2.1, and back to the armature 1.1. A measuring instrument, not shown, measures the voltage $V_n$ at the input terminals of the circuit to determine if the feed network can absorb energy. Energy can be absorbed when the voltage has dropped below a predetermined value. The thyristor 2.2 is then turned off. The size of the exciter current is determined by the clock ratio of the DC control 5. During the blocking period of the DC control 5, the field current flows through free wheeling diode 2.3 and the lower part of brake resistance 3.1. At the same time, a regenerative braking current flows from the armature of rotor 1, through line $L_2$, the lower part of resistance 3.1, the diode 2.6, the line $L_4$, the line L 1.1, the inductance L, to the power system, and from ground potential through the line $L_3$, the diode 2.1, the line $L_1$, and back to the armature 1.1.

If the voltage on the power system exceeds a predetermined value, this is an indication that the power system cannot absorb energy. Thyristor 2.2 is then fired together with the DC control 5. The braking energy is absorbed by brake resistance 3.1, the current flowing from the armature 1.1 over brake resistance 3.1, thyristor 2.2, and back to armature 1.1. Here too, the size of the exciter current, and thus also the braking current, is determined by the clock ratio of the DC control 5. During the blocking period of DC control 5, the field current flows through the free wheeling diode 2.3 and the lower part of the brake resistance 3.1.

The circuit according to the invention thus permits a combined regenerative and resistance braking operation, depending upon the absorption capacity of the feed power system. During the drive mode or operation, the thyristor 2.2 operates as a switching element for the free wheeling current of the field winding. During braking operation, the lower part of the resistance becomes the compound resistance in the free-wheeling field. Diode 2.6 acts as a decoupling diode for the power system. Diode 2.3 establishes a connection to the quenching circuit of the DC control 5. This permits extinction of thyristor 2.2 in the brake resistance circuit simultaneously with the main thyristor 5.2 of the DC control.

By virtue of the invention, when the power system driving the motor is incapable of absorbing energy, braking is assured by the fact that the energy portion not absorbed by the power system or the entire braking energy, is applied to the brake resistance.

While embodiments of the invention have been described in detail, it will be evident to those skilled in the art that the invention may be embodied otherwise without departing from its spirit and scope.

What is claimed is:

1. For a DC motor having a field winding and an armature winding, a drive and brake circuit comprising a choke, a DC controller, a rectifier, a brake resistance, a first diode, said brake resistance and said first diode being connected in series with each other and across the field winding, a plurality of switches, circuit means including the plurality of said switches for forming a series connection of the field winding and said rectifier and connecting the series connection parallel to the armature winding so as to drive the motor and for connecting the brake resistance in series with the rectifier and connecting the series connected brake resistance and rectifier parallel to the armature winding to brake the motor, said rectifier being ignitably controllable, a second diode, an extinguishing diode in the controller, said brake resistor having a terminal, a third diode, said field winding having two field winding terminals, two choke terminals on the choke, said second diode being connected between the extinguishing diode of the controller and one terminal of said brake resistor, said third diode being connected between one terminal of the field winding and one terminal of the choke.

2. A circuit as in claim 1, wherein said controller includes a thyristor, and further comprising means for igniting said controllable rectifier during drive operation at predetermined time intervals after firing of the thyristor in the controller.

3. A circuit as in claim 2, further comprising means responsive to current flowing through the armature for establishing the time interval of the ignition of the controllable rectifier from ignition of the thyristor.

4. A circuit as in claim 1, further comprising a capacitor between said choke and a ground and means responsive to the voltage across the capacitor for firing the controllable rectifier only in response to a predetermined minimum voltage across the capacitor.

5. A circuit as in claim 4, wherein said controller includes a thyristor, and further comprising means for igniting said controllable rectifier during drive operation at predetermined time intervals after firing of the thyristor in the controller.

6. A circuit as in claim 4, further comprising regulating means responsive to the voltage across the capacitor for establishing ignition pulses for the controlled rectifier after a predetermined time interval from extinction of the thyristor.

7. A circuit as in claim 1, wherein said controller includes an input and a connecting line connects one terminal of the field winding of the motor and the first diode, and further comprising a fourth diode connected between the input of the controller and the connecting line.

8. An apparatus as in claim 2, wherein said controller includes an input and a connecting line connects one terminal of the field winding of the motor and the first diode, and further comprising a fourth diode connected between the input of the controller and the connecting line.

9. A circuit as in claim 3, wherein said controller includes an input and a connecting line connects one terminal of the field winding of the motor and the first diode, and further comprising a fourth diode connected between the input of the controller and the connecting line.

10. A circuit as in claim 4, wherein said controller includes an input and a connecting line connects one terminal of the field winding of the motor and the first diode, and further comprising a fourth diode connected between the input of the controller and the connecting line.

11. A circuit as in claim 5, wherein said controller includes an input and a connecting line connects one terminal of the field winding of the motor and the first diode, and further comprising a fourth diode connected between the input of the controller and the connecting line.

12. A circuit as in claim 6, wherein said controller includes an input and a connecting line connects one terminal of the field winding of the motor and the first diode, and further comprising a fourth diode connected between the input of the controller and the connecting line.

13. A circuit as in claim 1, wherein said controllable rectifier is a thyristor having an anode and a cathode and said extinguishing diode includes an anode and a cathode, said second diode being connected in the forward direction between the anode of the thyristor and the cathode of the extinguishing diode.

14. A circuit as in claim 3, wherein said controllable rectifier is a thyristor having an anode and a cathode and said extinguishing diode includes an anode and a cathode, said second diode being connected in the forward direction between the anode of the thyristor and the cathode of the extinguishing diode.

15. A circuit as in claim 5, wherein said controllable rectifier is a thyristor having an anode and a cathode and said extinguishing diode includes an anode and a cathode, said second diode being connected in the forward direction between the anode of the thyristor and the cathode of the extinguishing diode.

16. A circuit as in claim 7, wherein said controllable rectifier is a thyristor having an anode and a cathode and said extinguishing diode includes an anode and a cathode, said second diode being connected in the forward direction between the anode of the thyristor and the cathode of the extinguishing diode.

17. A circuit as in claim 1, wherein said brake resistor includes a tap, one of the terminals of said field windings being connected to said tap, a switch connected at one end to said field winding and said first diode and connected at another end to the first terminal of the brake resistor, a second switch connecting the tap of the resistor to the second terminal of the first diode as well as to the second terminal of the resistor, a third switch connecting the choke to the input of said controller, a fourth switch connecting ground to the second terminal of the first diode, said first, second, third, and fourth switches being closed to form a drive mode for the motor, a fifth switch connecting the control element to ground, said fifth switch being closed during the braking operation and said first to fourth switches being open during the braking operation.

18. A circuit as in claim 17, further comprising means responsive to current flowing through the armature for establishing the time interval of the ignition of the controller rectifier from ignition of the thyristor.

19. A circuit as in claim 17, wherein said controller includes a thyristor, and further comprising means for igniting said controllable rectifier during drive operation at predetermined time intervals after firing of the thyristor in the controller.

20. A circuit as in claim 17, wherein said controller includes an input and a connecting line connects one terminal of the field winding of the motor and the first diode, and further comprising a fourth diode connected between the input of the controller and the connecting line.

21. A circuit as in claim 17, wherein said controller includes in input and a connecting line connects one terminal of the field winding of the motor and the first diode, and further comprising a fourth diode connected between the input of the controller and the connecting line.

22. A circuit as in claim 17, wherein said controller includes an input and a connecting line connects one terminal of the field winding of the motor and the first diode, and further comprising a fourth diode connected between the input of the controller and the connecting line.

23. A circuit as in claim 17, wherein said controllable rectifier is a thyristor having an anode and a cathode and said extinguishing diode includes an anode and a cathode, said second diode being connected in the forward direction between the anode of the thyristor and the cathode of the extinguishing diode.

24. A circuit as in claim 17, wherein said controllable rectifier is a thyristor having an anode and a cathode and said extinguishing diode includes an anode and a cathode, said second diode being connected in the forward direction between the diode of the thyristor and the cathode of the extinguishing diode.

* * * * *